(12) United States Patent
Morimoto et al.

(10) Patent No.: US 8,958,800 B2
(45) Date of Patent: Feb. 17, 2015

(54) RADIO COMMUNICATION SYSTEM AND COMMUNICATION CONTROL METHOD

(75) Inventors: Akihito Morimoto, Tokyo (JP); Nobuhiko Miki, Tokyo (JP); Masashige Shirakabe, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/007,405

(22) PCT Filed: Jul. 18, 2012

(86) PCT No.: PCT/JP2012/068185
§ 371 (c)(1),
(2), (4) Date: Sep. 25, 2013

(87) PCT Pub. No.: WO2013/024656
PCT Pub. Date: Feb. 21, 2013

(65) Prior Publication Data
US 2014/0024379 A1    Jan. 23, 2014

(30) Foreign Application Priority Data

Aug. 15, 2011 (JP) ................................ 2011-177428

(51) Int. Cl.
*H04W 36/00* (2009.01)
*H04W 36/30* (2009.01)
(Continued)

(52) U.S. Cl.
CPC .............. *H04W 36/30* (2013.01); *H04W 52/04* (2013.01); *H04W 16/32* (2013.01); *H04W 16/08* (2013.01); *H04W 36/0088* (2013.01); *H04W 48/20* (2013.01)
USPC ........... 455/436; 455/443; 455/444; 455/447; 455/449

(58) Field of Classification Search
CPC . H04W 84/045; H04W 52/244; H04W 16/18; H04W 16/20; H04W 16/24; H04W 16/32; H04W 16/08; H04W 52/143; H04W 52/146; H04W 36/30; H04W 52/343; H04W 52/346; H04W 36/0088

USPC ........... 455/435.2, 435.3, 436, 443, 444, 448, 455/449, 451, 452.1, 455, 13.4, 522
See application file for complete search history.

(56) References Cited

U.S. PATENT DOCUMENTS 8,498,644 B2 *  7/2013  Sawada et al. ................ 455/436
2005/0130662 A1  6/2005  Murai
(Continued)

FOREIGN PATENT DOCUMENTS

JP         2007-514367 A      5/2007

OTHER PUBLICATIONS

International Search Report for corresponding International Application No. PCT/JP2012/068185, mailed Aug. 14, 2012 (2 pages).
(Continued)

*Primary Examiner* — Jean Gelin
(74) *Attorney, Agent, or Firm* — Osha Liang LLP

(57) ABSTRACT

A radio communication system includes a first radio base station, second radio base stations, and mobile stations. Each of the mobile stations measures a first reception characteristic value and a second reception characteristic value for respective radio waves. The first radio base station determines the radio base station to which each of the mobile stations should connect, according to the first reception characteristic value, and classifies the mobile stations into a first mobile-station group and a second mobile-station group according to the second characteristic values. The first radio base station specifies a correction value according to the distribution of differences in the first reception characteristic value so as to reduce the sum of the number of mobile stations that belong to the second mobile-station group and that should connect to the first radio base station and the number of mobile stations that belong to the first mobile-station group and that should connect to second radio base stations.

15 Claims, 10 Drawing Sheets

(51) Int. Cl.
*H04W 48/20* (2009.01)
*H04W 52/04* (2009.01)
*H04W 16/32* (2009.01)
*H04W 16/08* (2009.01)

(56) References Cited

U.S. PATENT DOCUMENTS

2010/0130210 A1* 5/2010 Tokgoz et al. ............... 455/437
2011/0294508 A1* 12/2011 Min et al. ............... 455/436
2013/0021929 A1* 1/2013 Kim ............... 370/252
2014/0177601 A1* 6/2014 Nishio et al. ............... 370/332

OTHER PUBLICATIONS

3GPP TR 36.814 V9.0.0; "3rd Generation Partnership Project; Technical Specification Group Radio Access Network; Evolved Universal Terrestrial Radio Access (E-UTRA); Further advancements for E-UTRA physical layer aspects (Release 9)", Mar. 2010 (105 pages).

* cited by examiner

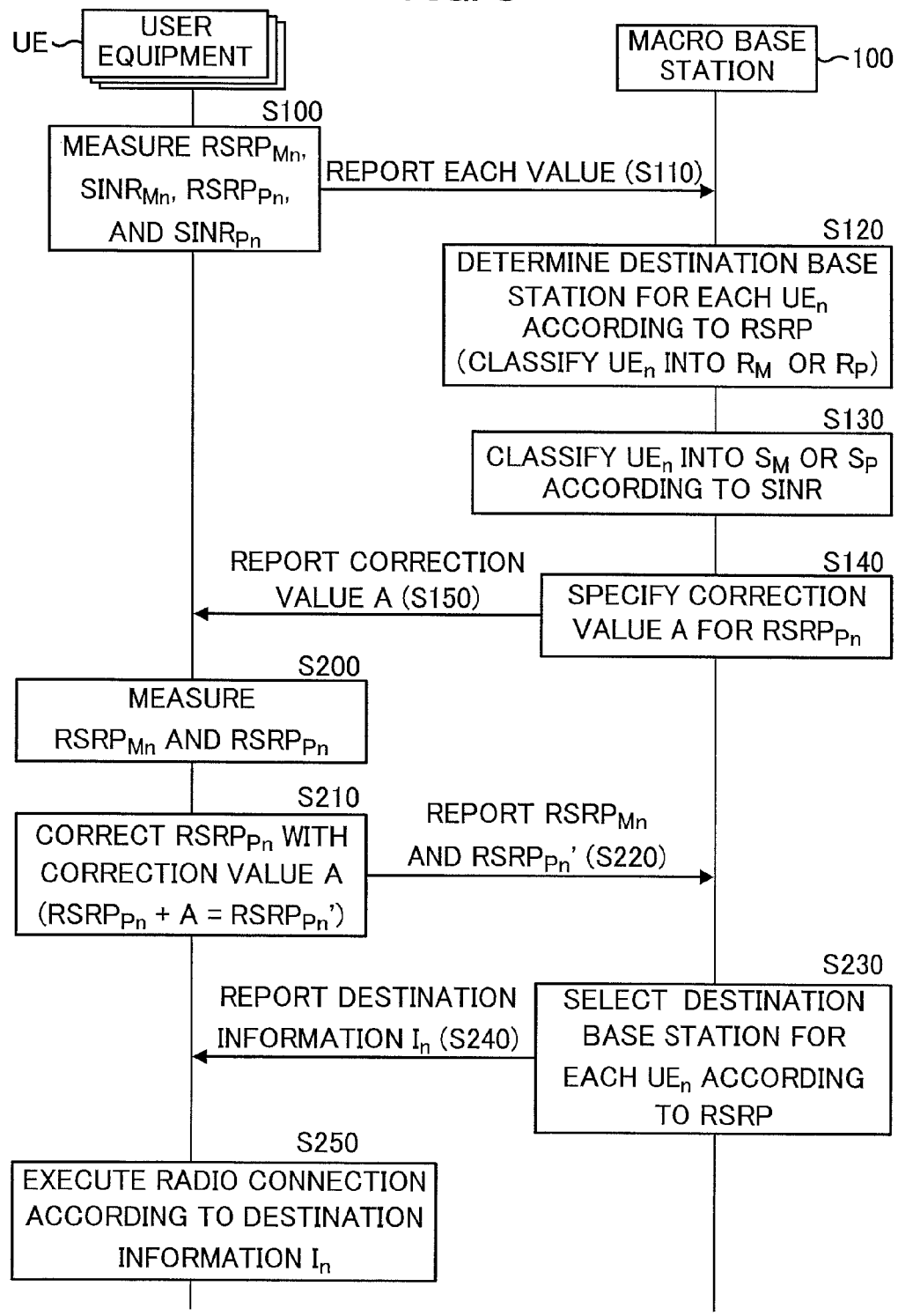

FIG. 9

| USER EQUIPMENT UE$_n$ | DIFFERENCE $\Delta_n$ IN RSRP | BASE STATION TO WHICH CONNECTION SHOULD BE MADE |
|---|---|---|
| UE$_1$ | $\Delta_1 = 3$ | MACRO BASE STATION |
| UE$_2$ | $\Delta_2 = -2$ | PICO BASE STATION |
| UE$_3$ | $\Delta_3 = 7$ | MACRO BASE STATION |
| ⋮ | ⋮ | ⋮ |
| UE$_N$ | $\Delta_N = 1$ | MACRO BASE STATION |

| USER EQUIPMENT UE$_n$ | SINR$_{Mn}$ | SINR$_{Pn}$ | LARGER SINR |
|---|---|---|---|
| UE$_1$ | 6 | 7 | SINR$_{P1}$ |
| UE$_2$ | 5 | 10 | SINR$_{P2}$ |
| UE$_3$ | 15 | 2 | SINR$_{M3}$ |
| ⋮ | ⋮ | ⋮ | ⋮ |
| UE$_N$ | 4 | 6 | SINR$_{PN}$ |

T$_S$ (A) WITHOUT CORRECTION (B) WITH CORRECTION

RADIO COMMUNICATION SYSTEM AND COMMUNICATION CONTROL METHOD

TECHNICAL FIELD

The present invention relates to radio communication systems and communication control methods.

BACKGROUND ART

In these years, heterogeneous networks (HetNets) have been proposed, in which a plurality of types of radio base stations having different transmission powers (transmission capabilities), such as a macro base station, a pico base station, a femto base station, and a remote radio head, are installed in a multi-layered manner. In heterogeneous networks, a base station having a high transmission power (for example, a macro base station) tends to be selected as the radio connection destination of a user equipment in a cell searching stage or a handover stage compared with a base station having a low transmission power (for example, a pico base station). Therefore, connections from user equipments tend to concentrate on a base station having a high transmission power, causing excessive communication load.

To solve the above problem, Patent Document 1, for example, discloses a technology that controls a communication cell boundary in a variable manner by changing an offset value (correction value) that numerically reduces the power level received by a mobile station, according to parameters, such as the load and the amount of traffic on a radio communication system. The mobile station in Patent Document 1 selects a destination base station (macro-cell base station, micro-cell base station) according to the offset power level (reception power).

CITATION LIST

Patent Document

Patent Document 1: Japanese Patent Application Laid-Open Publication No. 2007-514367

SUMMARY OF INVENTION

Technical Problem

In the configuration of Patent Document 1 in which a correction value that numerically reduces the power level received by a mobile station is changed according to parameters, such as the load and the amount of traffic on a radio communication system, however, since the effects imposed by noise power and interference from another radio base station (in other words, imposed by components other than desired waves) on the desired waves are not appropriately taken into account in the selection of the radio connection destination, the radio connection destination of a user equipment may be selected inappropriately.

Taking this situation into account, an object of the present invention is to correct a characteristic value (reception power or the like) used to select the radio connection destination with the effects of components other than the desired waves on the desired waves taken into account, to more appropriately select the radio connection destination of a user equipment (mobile station) in a radio communication system having a plurality of types of radio base stations having different transmission powers (transmission capabilities).

Solution to Problem

A radio communication system according to the present invention includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. Each of the plurality of mobile stations further includes a characteristic-value measuring section that measures a first reception characteristic value and a second reception characteristic value related to radio waves sent from each of the first radio base station and the second radio base station corresponding to the first cell and the second cell in which the mobile station is located; and a characteristic-value reporting section that reports the first reception characteristic value and the second reception characteristic value corresponding to each of the first radio base station and the second radio base station to the first radio base station through the radio communication section. The first radio base station includes a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the first radio base station, among the mobile stations included in the second mobile-station group; and a correction-value reporting section that reports the correction value specified by the correction-value specifying section to the plurality of mobile stations. Each of the plurality of mobile stations further includes a characteristic-value correcting section that corrects the first reception characteristic value related to radio waves sent from the second radio base station, measured by the characteristic-value measuring section, by using the correction value reported from the correction-value reporting section of the first radio base station. Either the first radio base station or each of the plurality of mobile stations includes a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

The first reception characteristic value is calculated from radio waves that the mobile station tries to receive (desired radio waves) and can be, for example, reception power (reference signal received power) or reception quality (reference signal received quality). The second reception characteristic value is calculated from the desired radio waves and components other than the desired radio waves (for example, noise power or interference power for the desired radio waves) and can be, for example, the signal to interference-plus-noise ratio, the signal to interference ratio, or the signal to noise ratio.

In the above-described configuration, the first reception characteristic values of the second radio base stations, used to select the radio base stations to which the mobile stations should connect, are corrected with the correction value specified according to the distribution of the differences between the first reception characteristic values corresponding to the first radio base station and the first reception characteristic values corresponding to the second radio base stations, measured by the mobile stations included in the second mobile-station group classified according to the second reception characteristic values. Therefore, a radio base station having a better second reception characteristic value tends to be selected as the connection destination of each mobile station.

It is preferable that the correction-value specifying section of the first radio base station specify the correction value used to correct the first reception characteristic value corresponding to each of the second radio base stations, measured by each of the plurality of mobile stations, such that the number of mobile stations having the first reception characteristic values with which the destination determination section determines that the mobile stations should connect to the first radio base station becomes the minimum among the mobile stations included in the second mobile-station group.

According to the above-described configuration, among the mobile stations included in the second mobile-station group, in which the second reception characteristic values of the second radio base stations are larger, the number of mobile stations having the first reception characteristic values with which the destination determination section determines that the mobile stations should connect to the first radio base station is reduced.

Another radio communication system according to the present invention includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. Each of the plurality of mobile stations further includes a characteristic-value measuring section that measures a first reception characteristic value and a second reception characteristic value related to radio waves sent from each of the first radio base station and the second radio base station corresponding to the first cell and the second cell in which the mobile station is located; and a characteristic-value reporting section that reports the first reception characteristic value and the second reception characteristic value corresponding to each of the first radio base station and the second radio base station to the first radio base station through the radio communication section. The first radio base station includes a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations. Each of the plurality of mobile stations further includes a characteristic-value correcting section that corrects the first reception characteristic value related to radio waves sent from the second radio base station, measured by the characteristic-value measuring section, by using the correction value reported from the correction-value reporting section of the first radio base station. Either the first radio base station or each of the plurality of mobile stations includes a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

In the above-described configuration, the first reception characteristic values of the second radio base stations, used to select the radio base stations to which the mobile stations should connect, are corrected with the correction value specified according to the distribution of the differences between the first reception characteristic values corresponding to the first radio base station and the first reception characteristic values corresponding to the second radio base stations, measured by the mobile stations included in the first mobile-station group classified according to the second reception characteristic values. Therefore, a radio base station having a better second reception characteristic value tends to be selected as the connection destination of each mobile station.

It is preferable that the correction-value specifying section of the first radio base station specify the correction value used to correct the first reception characteristic value corresponding to each of the second radio base stations, measured by each of the plurality of mobile stations, such that the number of mobile stations having the first reception characteristic values with which the destination determination section determines that the mobile stations should connect to the second radio base station becomes the minimum among the mobile stations included in the first mobile-station group.

According to the above-described configuration, the number of mobile stations having first reception characteristic values with which the destination determination section determines that the mobile stations should connect to the second radio base stations is reduced, among the mobile stations included in the first mobile-station group, in which the second reception characteristic values of the first radio base station are larger.

Another radio communication system according to the present invention includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. Each of the plurality of mobile stations further includes a characteristic-value measuring section that measures a first reception characteristic value and a second reception characteristic value related to radio waves sent from each of the first radio base station and the second radio base station corresponding to the first cell and the second cell in which the mobile station is located; and a characteristic-value reporting section that reports the first reception characteristic value and the second reception characteristic value corresponding to each of the first radio base station and the second radio base station to the first radio base station through the radio communication section. The first radio base station includes a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations. Each of the plurality of mobile stations further includes a characteristic-value correcting section that corrects the first reception characteristic value related to radio waves sent from the second radio base station, measured by the characteristic-value measuring section, by using the correction value reported from the correction-value reporting section of the first radio base station. Either the first radio base station or each of the plurality of mobile stations includes a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

In the above-described configuration, the first reception characteristic values of the second radio base stations, used to select the radio base stations to which the mobile stations should connect, are corrected with the correction value specified according to the distribution of the differences between the first reception characteristic values corresponding to the first radio base station and the first reception characteristic values corresponding to the second radio base stations, measured by the mobile stations included in the second mobile-station group classified according to the second reception characteristic values and according to the distribution of the differences between the first reception characteristic values corresponding to the first radio base station and the first reception characteristic values corresponding to the second radio base stations, measured by the mobile stations included in the first mobile-station group classified according to the second reception characteristic values. Therefore, a radio base station having a better second reception characteristic value tends to be selected as the connection destination of each mobile station.

It is preferable that the correction-value specifying section of the first radio base station specify the correction value used to correct the first reception characteristic value corresponding to each of the second radio base stations, measured by each of the plurality of mobile stations, such that the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group, becomes the minimum.

According to the above-described configuration, the sum of the number of mobile stations having the first reception characteristic values with which the destination determination section determines that the mobile stations should connect to the first radio base station among the mobile stations included in the second mobile-station group, in which the second reception characteristic values of the second radio base stations are larger, and the number of mobile stations having the first reception characteristic values with which the destination determination section determines that the mobile stations should connect to the second radio base stations among the mobile stations included in the first mobile-station group, in which the second reception characteristic values of the first radio base station are larger, is reduced.

It is further preferable that, at first predetermined intervals, each of the plurality of mobile stations measure and report the first reception characteristic value and the second reception characteristic value, and the first radio base station determine the radio base station to which each of the plurality of mobile stations should connect, classify the plurality of mobile stations, specify the correction value, and report the correction value to the plurality of mobile stations; and, at second predetermined intervals shorter than the first predetermined intervals, each of the plurality of mobile stations measure the first reception characteristic value and correct the first reception characteristic value related to radio waves sent from the second radio base station by using the correction value, and either the first radio base station or each of the plurality of mobile stations select the radio base station to which the mobile station should connect.

In the above-described configuration, while the frequency at which the mobile stations measure the second reception characteristic values is reduced, the first reception characteristic values related to radio waves sent from the second radio base stations are corrected based on the correction value specified according to the second reception characteristic values. Therefore, the radio connection destinations can be selected according to the second reception characteristic values, and the power consumption of the mobile stations can be reduced at the same time.

A radio base station according to the present invention is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section. The first radio base station includes: a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the first radio base station, among the mobile stations included in the second mobile-station group; and a correction-value reporting section that reports the correction value specified by the correction-value specifying section to the plurality of mobile stations.

Another radio base station according to the present invention is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section. The first radio base station includes: a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations.

Another radio base station according to the present invention is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section. The first radio base station includes: a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations; a correction-value specifying section that specifies, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations.

A communication control method according to the present invention is for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. The communication control method includes: measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations; determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations; specifying, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which it is determined that the mobile stations should connect to the first radio base station, among the mobile stations included in the second mobile-station group; reporting the specified correction value to the plurality of mobile stations; correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

Another communication control method according to the present invention is for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. The communication control method includes: measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations; determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations; specifying, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which it is determined that the mobile stations should connect to the second radio base station, among the mobile stations included in the first mobile-station group; reporting the specified correction value to the plurality of mobile stations; correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

Another communication control method according to the present invention is for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells. The communication control method includes: measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations; determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect; classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations; specifying, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which it is determined that the mobile stations should connect to the first radio base station, among the mobile stations included in the second mobile-station group, and the number of mobile stations having the first reception characteristic values with which it is determined that the mobile stations should connect to the second radio base station, among the mobile stations included in the first mobile-station group; reporting the specified correction value to the plurality of mobile stations; correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

BRIEF DESCRIPTION OF THE DRAWINGS

FIG. 8 is a sequence diagram of how the reception power is corrected in the radio communication system.

FIG. 9 is a view indicating a table in which a user equipment, a difference in reception power, and a destination base station are associated with each other.

FIG. 10 is a view indicating a table in which a user equipment, the signal to interference-plus-noise ratio from each radio base station, and a larger signal to interference-plus-noise ratio are associated with each other.

DESCRIPTION OF EMBODIMENTS

First Embodiment

Figure 1:
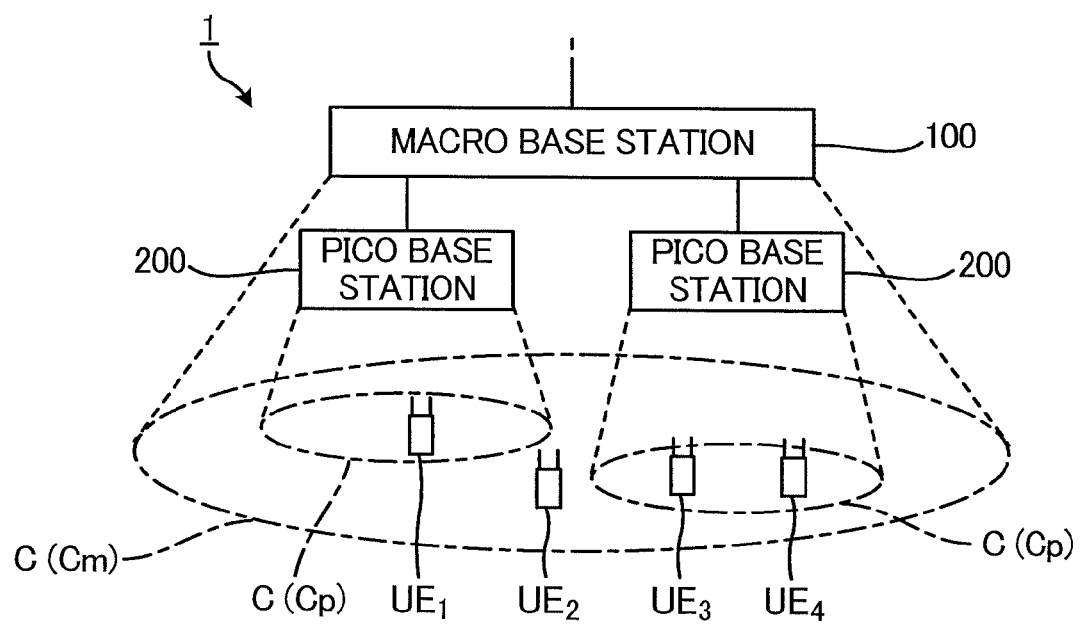
FIG. 1 is a block diagram showing a radio communication system according to an embodiment of the present invention.

FIG. 1 is a block diagram showing a radio communication system 1 according to a first embodiment of the present invention. The radio communication system 1 includes a macro base station (macro evolved node B (eNodeB)) 100, pico base stations (pico eNodeB) 200, and user equipments UE. For simplicity of description, only one macro base station 100 is shown in the figure, but it is understood as a matter of course that the radio communication system 1 can include a plurality of macro base stations 100.

Communication elements (such as the macro base station 100, the pico base stations 200, and the user equipments UE) in the radio communication system 1 perform radio communication according to a predetermined radio access technology, such as long term evolution (LTE). In the present embodiment, an example case will be described in which the radio communication system 1 operates according to LTE, but there is no intention to limit the technical scope of the present invention. The present invention can also be applied to other radio access technologies after necessary design changes are made.

The macro base station 100 and the pico base stations 200 are connected to each other by wire or by radio. The macro base station 100 forms a macro cell Cm. In the macro cell Cm, N (N is a natural number) user equipments UE ($UE_1$, $UE_2$, ..., $UE_N$) are located. In FIG. 1, four user equipments UE are shown for convenience. In the following description, any single user equipment UE located in the macro cell Cm is indicated by $UE_n$ with the use of a subscript n. To indicate elements and other components corresponding to the user equipment $UE_n$, a subscript n may be added to the reference symbols of the elements and other components.

The pico base stations 200 form pico cells Cp. The pico cells Cp are formed in the macro cell Cm formed by the macro base station 100 to which the pico base stations 200 that form the pico cells Cp are connected. In one macro cell Cm, a plurality of pico cells Cp can be formed.

Each of the base stations (the macro base station 100 and the pico base stations 200) can communicate by radio with a user equipment UE located in the cell of that base station. Conversely, a user equipment UE can communicate by radio with the base station (macro base station 100 or pico base station 200) corresponding to the cell C (macro cell Cm or pico cell Cp) in which that user equipment UE is located. The user equipment UE can select the radio-connection-destination base station according to the reception power (reference signal received power, RSRP) of a radio signal sent from each base station. For example, the user equipment UE can select a base station that sends a radio signal corresponding to the highest reception power RSRP as the radio-connection-destination base station.

Since the macro base station 100 has a higher radio transmission capability (maximum transmission power, average transmission power, etc.) than the pico base stations 200, the macro base station 100 can communicate by radio with a user equipment UE located farther away. Therefore, the macro cell Cm is larger in area than the pico cells Cp. For example, the macro cell Cm has a radius of about several hundred meters to several tens of kilometers, whereas the pico cells Cp have a radius of about several meters to several tens of meters.

As understood from the foregoing description, the macro base station 100 and the pico base stations 200 in the radio communication system 1 form a heterogeneous network (HetNet), in which a plurality of types of radio base stations having different transmission powers (transmission capabilities) are installed in a multi-layer manner (see 3rd Generation Partnership Project; Technical Specification Group Radio Access Network; Evolved Universal Terrestrial Radio Access (E-UTRA); Further advancements for E-UTRA physical layer aspects (Release 9); 3GPP IR 36.814 V9.0.0 (2010-03); Section 9A, Heterogeneous Deployments).

Since the pico cells Cp are formed inside (are overlaid on) the macro cell Cm in a multi-layer manner, when a user equipment UE is located in a pico cell Cp, it can be understood that the user equipment UE can receive radio waves (radio signals) from both the pico base station 200 forming that pico cell Cp and the macro base station 100 forming the macro cell Cm that includes the pico cell Cp.

Any radio communication method can be used between each base station and a user equipment UE. For example, orthogonal frequency division multiple access (OFDMA) may be employed for downlink, and single-carrier frequency division multiple access (SC-FDMA) may be employed for uplink.

Figure 2:
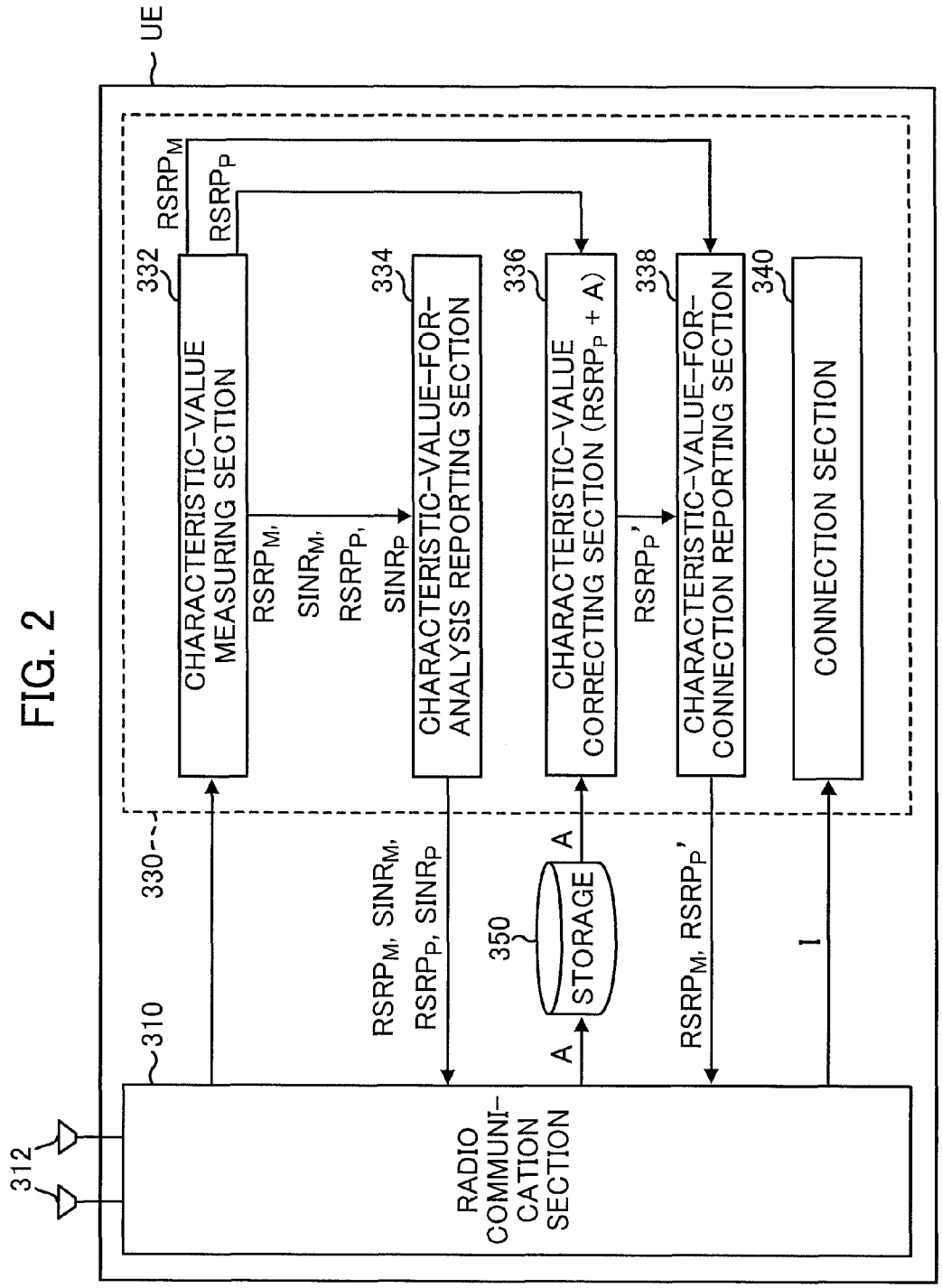
FIG. 2 is a block diagram showing the configuration of a user equipment according to the embodiment of the present invention.

FIG. 2 is a block diagram showing the configuration of the user equipment UE according to the first embodiment of the present invention. The user equipment UE includes a radio communication section 310, a controller 330, and a storage 350. For convenience, an output unit for outputting sound or video, an input unit for accepting instructions from the user, and other units are omitted in the figure.

The radio communication section 310 executes radio communication with a base station (macro base station 100, pico base station 200). The radio communication section 310 includes transmission and reception antennas 312, a receiving circuit for receiving radio waves from a base station and converting them to an electrical signal, and a transmission circuit for converting an electrical signal, such as a voice signal, to radio waves and sending them. The radio communication section 310 also receives a correction value A and destination information I from the macro base station 100 forming the macro cell Cm in which the user equipment $UE_n$ is located, and sends, to the macro base station 100, the reception power $RSRP_M$ and the signal to interference-plus-noise ratio $SINR_M$ of radio waves received from the macro base station 100 and the reception power $RSRP_P$ and the signal to interference-plus-noise ratio $SINR_P$ of radio waves received from the pico base station (details will be described later).

The storage 350 stores the correction value A received from the macro base station 100 and other information and may be a random access memory (RAM), for example.

For the sake of simplicity, in the following description, the reception power $RSRP_M$ and the signal to interference-plus-noise ratio $SINR_M$ of radio waves received from the macro base station 100 are called macro reception power $RSRP_M$ and a macro signal to interference-plus-noise ratio $SINR_M$, respectively, in some cases; and the reception power $RSRP_P$ and the signal to interference-plus-noise ratio $SINR_P$ of radio waves received from the pico base station are called pico reception power $RSRP_P$ and a pico signal to interference-plus-noise ratio $SINR_P$, respectively, in some cases. In addition, only the symbols (that is, $RSRP_M$, $SINR_M$, $RSRP_P$, and $SINR_P$) are used to indicate the corresponding reception powers and the signal to interference-plus-noise ratios in some cases.

The controller 330 includes a characteristic-value measuring section 332, a characteristic-value-for-analysis reporting section 334, a characteristic-value correcting section 336, a characteristic-value-for-connection reporting section 338, and a connection section 340. The controller 330, together with the characteristic-value measuring section 332, the characteristic-value-for-analysis reporting section 334, the characteristic-value correcting section 336, the characteristic-value-for-connection reporting section 338, and the connection section 340 included in the controller 330, can be functional blocks implemented when a central processing unit (CPU), not shown, included in the user equipment UE executes a computer program stored in the storage 350 and functions according to the computer program. The detailed operation of the controller 330 will be described later.

Figure 3:
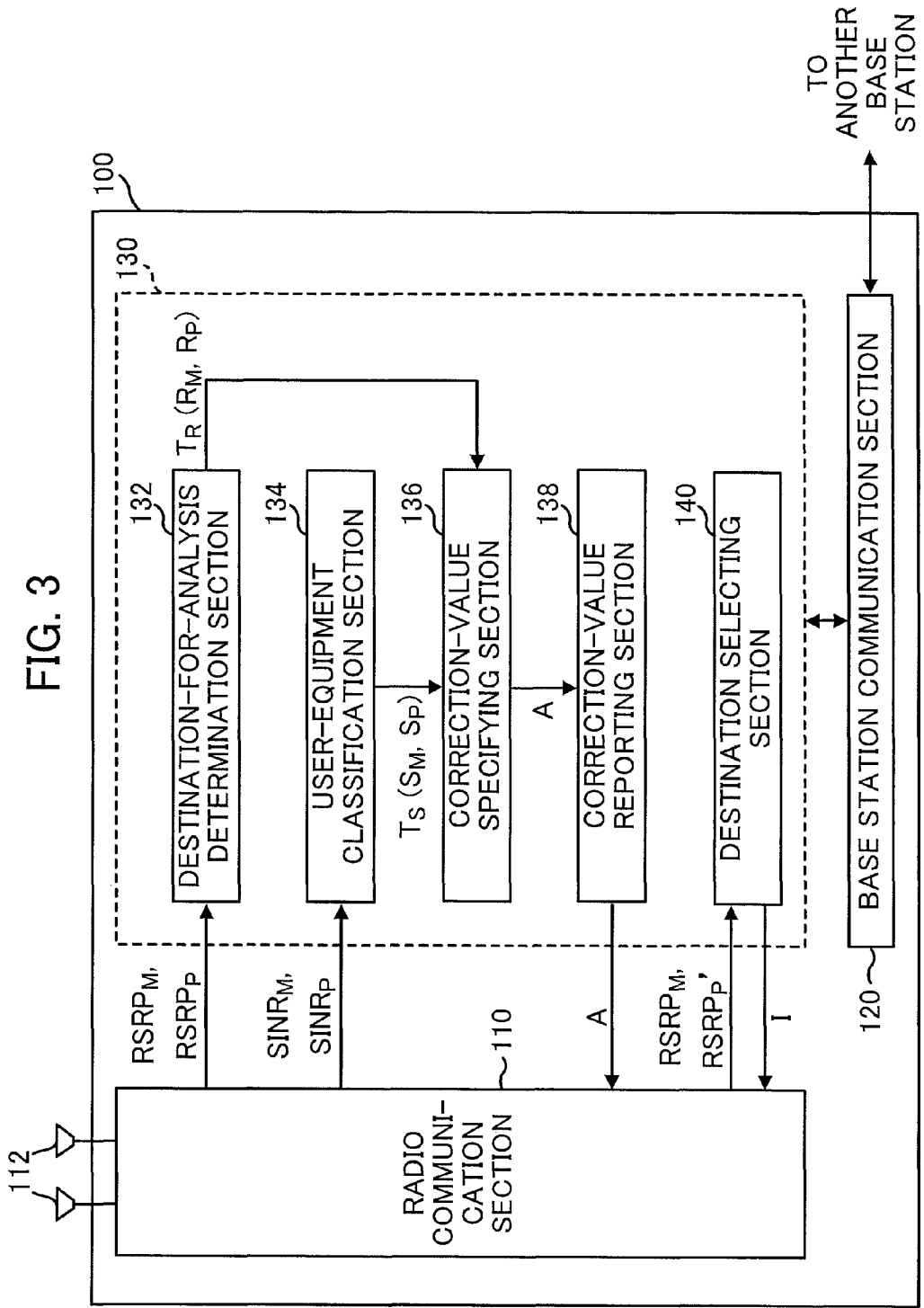
FIG. 3 is a block diagram showing the configuration of a macro base station according to the embodiment of the present invention.

FIG. 3 is a block diagram showing the configuration of the macro base station 100 according to the first embodiment of the present invention. The macro base station 100 includes a radio communication section 110, a base-station communication section 120, and a controller 130.

The radio communication section 110 connects by radio to a user equipment UE to execute radio communication. The radio communication section 110 includes transmission and reception antennas 112, a receiving circuit for receiving radio waves from the user equipment UE and converting them to an electrical signal, and a transmission circuit for converting an electrical signal, such as a voice signal, to radio waves and sending them. The radio communication section 110 also sends the correction value A and the destination information I to the user equipment UE located in the macro cell Cm formed by the macro base station 100 and receives, from the user equipment UE located in the macro cell Cm formed by the macro base station 100, the reception power $RSRP_M$ and the signal to interference-plus-noise ratio $SINR_M$ of radio waves received from the macro base station 100 and the reception power $RSRP_P$ and the signal to interference-plus-noise ratio $SINR_P$ of radio waves received from the pico base station (details will be described later).

The base-station communication section 120 executes communication with another base station (macro base station 100, pico base station 200) and sends and receives electrical signals to and from the other base station. When the macro base station 100 communicates with another base station by radio, it is understood as a matter of course that the radio communication section 110 can also operate as the base-station communication section 120.

The controller 130 includes a destination-for-analysis determination section 132, a user-equipment classification section 134, a correction-value specifying section 136, a correction-value reporting section 138, and a destination selecting section 140. The controller 130, together with the destination-for-analysis determination section 132, the user-equipment classification section 134, the correction-value specifying section 136, the correction-value reporting section 138, and the destination selecting section 140 included in the controller 130, can be functional blocks implemented when a CPU, not shown, included in the macro base station 100 executes a computer program stored in a storage, not shown, and functions according to the computer program. The detailed operation of the controller 130 will be described later.

Figure 4:
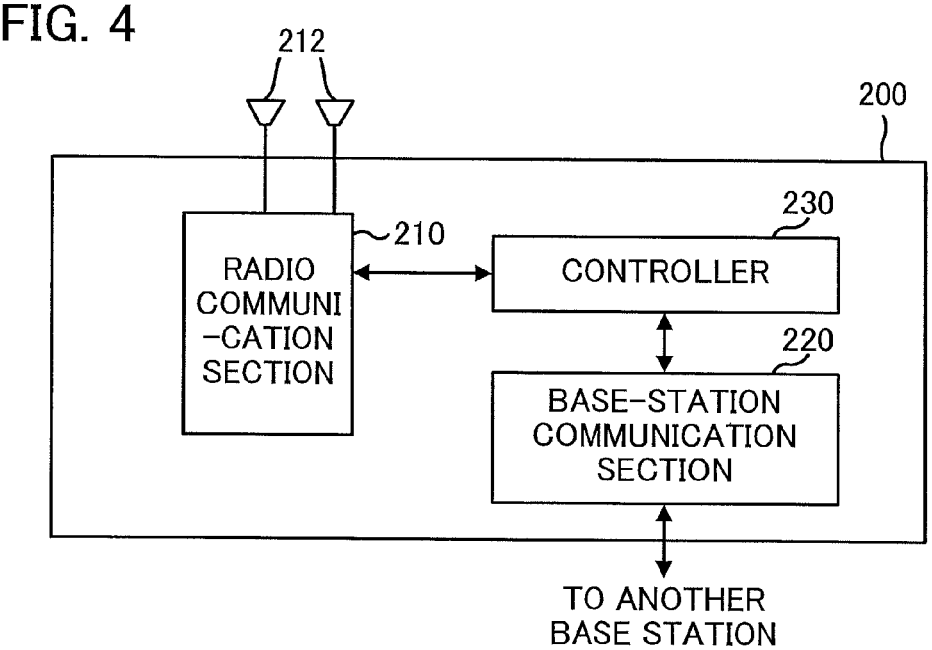
FIG. 4 is a block diagram showing the configuration of a pico base station according to the embodiment of the present invention.

FIG. 4 is a block diagram showing the configuration of the pico base station 200 according to the embodiment of the present invention. The pico base station 200 includes a radio communication section 210, a base-station communication section 220, and a controller 230.

The radio communication section 210 executes radio communication with a user equipment UE. The radio communication section 210 includes transmission and reception antennas 212, a receiving circuit for receiving radio waves from the user equipment UE and converting them to an electrical signal, and a transmission circuit for converting an electrical signal, such as a voice signal, to radio waves and sending them.

The base-station communication section 220 executes communication with the macro base station 100 to which the pico base station 200 is connected and sends and receives electrical signals to and from the macro base station 100. When the pico base station 200 communicates with the macro base station 100 by radio, the radio communication section 210 may also operate as the base-station communication section 220.

The pico base station 200 can receive information (for example, the correction value A, the destination information I, or other information) sent from the macro base station 100 and forward the information to the user equipment UE, and can receive information ($RSRP_{Mn}$, $SINR_{Mn}$, $RSRP_{Pn}$, and $SINR_{Pn}$, or other information) sent from the user equipment UE and forward the information to the macro base station 100. More specifically, the controller 230 supplies, to the radio communication section 210, an electrical signal that the base-station communication section 220 of the pico base station 200 receives from the base-station communication section 120 of the macro base station 100. The radio communication section 210 converts the supplied electrical signal to radio waves and sends them to the user equipment UE. The controller 230 also supplies, to the base-station communication section 220, an electrical signal received and converted by the radio communication section 210 of the pico base station 200. The base-station communication section 220 sends the supplied electrical signal to the macro base station 100. With the above-described configuration, even if it is difficult for the user equipment UE to communicate with the macro base station 100 by radio because the user equipment UE is close to the pico base station 200, necessary information can be exchanged between the user equipment UE and the macro base station 100.

The controller 230 of the pico base station 200 can be a functional block implemented when a CPU, not shown, included in the pico base station 200 executes a computer program stored in a storage, not shown, and functions according to the computer program.

Figure 5:
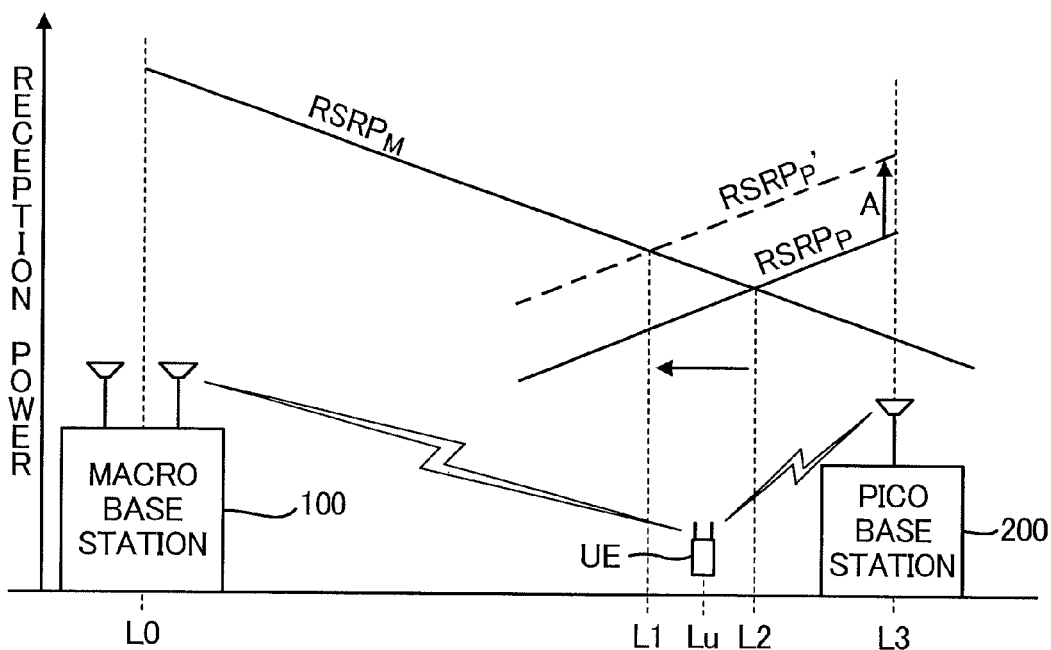
FIG. 5 is a view explaining how to select the destination base station according to the embodiment of the present invention.

An outline of how the radio connection destination is selected according to the reception power RSRP will be described with reference to FIG. 5. As shown in FIG. 5, the user equipment UE receives radio waves from the macro base station 100 and the pico base station 200. The characteristic-value measuring section 332 of the user equipment UE measures the macro reception power $RSRP_M$ and the pico reception power $RSRP_P$ of the received radio waves. As shown in the figure, the farther the user equipment UE is from each base station, the lower the reception power ($RSRP_M$, $RSRP_P$) of the radio waves is.

For the sake of explanation, it is assumed in the following description that the macro base station 100 is disposed at a position L0, the pico base station 200 is disposed at a position L3, and the macro reception power $RSRP_M$ is equal to the pico reception power $RSRP_P$ at a position L2. It is also assumed that the user equipment UE is disposed at a position Lu closer to the macro base station 100 than the position L2 is.

As shown in FIG. 5, at the position Lu, the macro reception power $RSRP_M$ is larger than the pico reception power $RSRP_P$. Therefore, based on a technology in which the user equipment UE simply connects by radio to a base station that transmits radio waves having a high reception power, a network-side apparatus, such as the macro base station 100, or the user equipment UE would determine that the user equipment UE disposed at the position Lu should connect to the macro base station 100 by radio.

However, the technology in which the user equipment UE simply connects by radio to a base station that transmits radio waves having a high reception power has the following problems.

Figure 6:
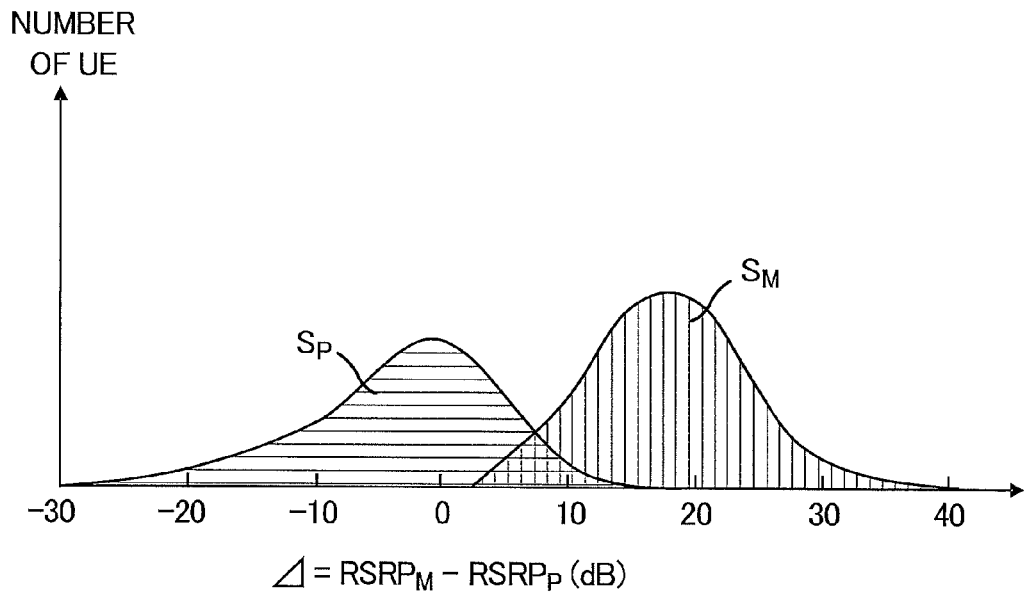
FIG. 6 is a graph showing the distribution of the difference between the reception power of radio waves sent from a macro base station and the reception power of radio waves sent from a pico base station at each of a plurality of user equipments.

FIG. 6 is a graph showing the distribution of the difference $\Delta (=RSRP_M - RSRP_P)$ between the macro reception power $RSRP_M$ and the pico reception power $RSRP_P$ calculated for each of a plurality of user equipments UE. The horizontal axis indicates the difference $\Delta$ between $RSRP_M$ and $RSRP_P$ in decibels (dB), and the vertical axis indicates the number of user equipments UE on a relative scale.

A plurality of user equipments UE are classified into a set $S_M$ and a set $S_P$ according to the signal to interference-plus-noise ratio SINR. The set $S_M$ is a set of user equipments UE in which the macro signal to interference-plus-noise ratio $SINR_M$ exceeds the pico signal to interference-plus-noise ratio $SINR_P$. The set $S_P$ is a set of user equipments UE in which the pico signal to interference-plus-noise ratio $SINR_P$ exceeds the macro signal to interference-plus-noise ratio $SINR_M$.

In general, as shown in the figure, the difference $\Delta$ in reception power RSRP at the user equipments UE belonging to the set $S_M$ tends to exceed the difference $\Delta$ in reception power RSRP at the user equipments UE belonging to the set $S_P$. In other words, a correlation is generally recognized between the reception power RSRP and the signal to interference-plus-noise ratio SINR at the user equipments UE. However, for each of the user equipments UE, it is not necessarily true that the larger the reception power RSRP, the larger the signal to interference-plus-noise ratio SINR. This matter will be described below specifically with reference to FIG. 7.

Figure 7:
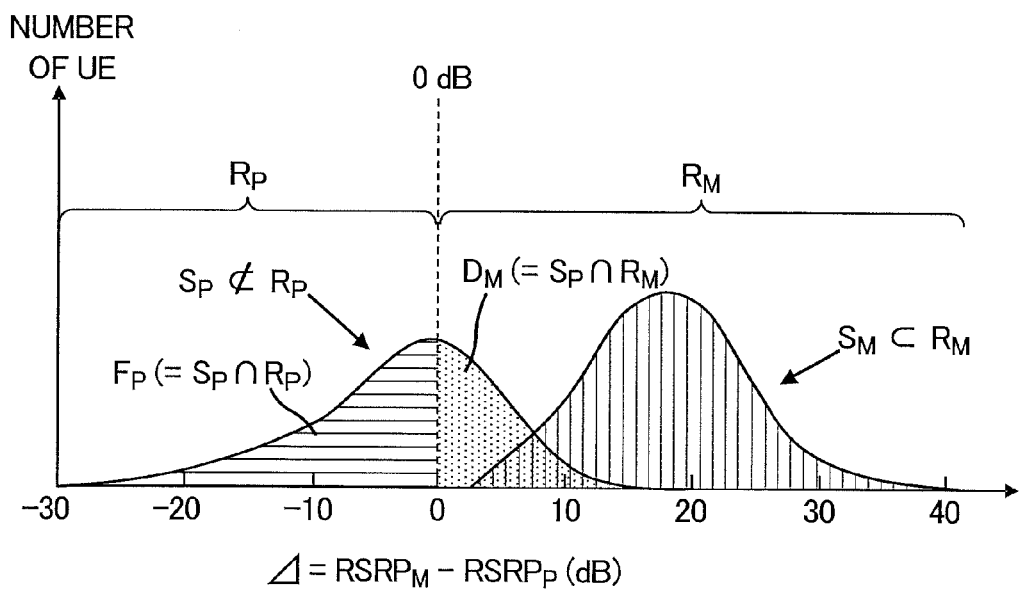
FIG. 7 is a view showing example relationships among reception power, a signal to interference-plus-noise ratio, and a destination radio base station in a first embodiment.

FIG. 7 is a view explaining the relationship between the signal to interference-plus-noise ratios at the user equipments UE and the destination radio base stations of the user equipments UE. A set of user equipments UE having positive differences $\Delta (\Delta > 0)$ in reception power RSRP is called a set $R_M$, and a set of user equipments UE having negative differences $\Delta (\Delta < 0)$ in reception power RSRP is called a set $R_P$.

When the differences $\Delta$ are positive ($\Delta > 0$), the macro reception power $RSRP_{Mn}$ exceeds the pico reception power $RSRP_{Pn}$. Therefore, it is determined according to the simple reception power RSRP criterion that the user equipments $UE_n$ included in the set $R_M$ should connect to the macro base station 100. On the other hand, when the differences $\Delta$ are negative ($\Delta < 0$), the pico reception power $RSRP_{Pn}$ exceeds the macro reception power $RSRP_{Mn}$. Therefore, it is determined according to the simple reception power RSRP criterion that the user equipments $UE_n$ included in the set $R_P$ should connect to the pico base station 200.

As shown in FIG. 7, all of the user equipments UE included in the set $S_M$ are included in the set $R_M$. In other words, as a result of the connection-destination selection based on the reception power RSRP, it is determined that all of the user equipments UE included in the set $S_M$ should connect to the macro base station 100, for which the signal to interference-plus-noise ratios SINR are higher.

On the other hand, the user equipments UE included in the set $S_P$ are divided into a subset $F_P$ included in the set $R_P$ and a subset $D_M$ included in the set $R_M$. In other words, as a result of the connection-destination selection based on the reception power RSRP, it is determined that some user equipments UE included in the set $S_P$ (user equipments UE included in the subset $F_P$) should connect to the pico base station 200, for which the signal to interference-plus-noise ratios SINR are higher, but that the other user equipments UE included in the set $S_P$ (user equipments UE included in the subset $D_M$) should connect to the macro base station 100, for which the signal to interference-plus-noise ratios SINR are lower.

When the signal to interference-plus-noise ratio SINR of radio waves is low, the reception quality of the user equipment UE is low even if the reception power RSRP is high. Therefore, in some cases, it is not appropriate, in terms of the convenience of the users of the user equipments UE and the communication quality in the entire radio communication system 1, that a large number of user equipments UE are connected to a base station for which the signal to interference-plus-noise ratios SINR of radio waves are lower.

On the other hands, the user equipments UE have a high processing load when measuring the signal to interference-plus-noise ratios SINR of radio waves (in particular, measuring interference power necessary for SINR measurement). Therefore, in some cases, it is undesirable, in terms of reducing power consumption and improving processing speed in the user equipments, that the user equipments UE always measure the signal to interference-plus-noise ratios SINR of radio waves and select the radio connection destinations.

In view of these situations, the present embodiment corrects the reception power RSRP used to select the radio connection destination of each user equipment UE, with a correction value A specified by considering the signal to interference-plus-noise ratio SINR, so that a base station for which the signal to interference-plus-noise ratio SINR is higher is selected as the radio connection destination of the user equipment UE.

How the correction value A is specified and the destination base station is selected for a user equipment UE in the first embodiment will be described with reference to FIG. 8.

The characteristic-value measuring section 332 of each user equipment $UE_n$ measures the reception power $RSRP_{Mn}$ and the signal to interference-plus-noise ratio $SINR_{Mn}$ of radio waves received from the macro base station 100 forming the macro cell Cm in which the user equipment $UE_n$ is located, and the reception power $RSRP_{Pn}$ and the signal to interference-plus-noise ratio $SINR_{Pn}$ of radio waves received from the pico base station 200 forming the pico cell Cp in which the user equipment $UE_n$ is located (step S100). The measured macro reception power $RSRP_{Mn}$, macro signal to interference-plus-noise ratio $SINR_{Mn}$, pico reception power $RSRP_{Pn}$, and pico signal to interference-plus-noise ratio $SINR_{Pn}$ are supplied to the characteristic-value-for-analysis reporting section 334. The characteristic-value-for-analysis reporting section 334 reports (sends) the supplied macro reception power $RSRP_{Mn}$, macro signal to interference-plus-noise ratio $SINR_{Mn}$, pico reception power $RSRP_{Pn}$, and pico signal to interference-plus-noise ratio $SINR_{Pn}$ to the macro base station 100 through the radio communication section 310 (step S110).

The radio communication section 110 of the macro base station 100 receives the reported macro reception power $RSRP_{Mn}$, macro signal to interference-plus-noise ratio $SINR_{Mn}$, pico reception power $RSRP_{Pn}$, and pico signal to interference-plus-noise ratio $SINR_{Pn}$ from each user equipment UE and supplies them to the controller 130. Since the macro cell Cm includes N user equipments UE, it is understood that N macro reception powers $RSRP_{Mn}$, macro signal to interference-plus-noise ratios $SINR_{Mn}$, N pico reception powers $RSRP_{Pn}$, and N pico signal to interference-plus-noise ratios $SINR_{Pn}$ are supplied to the controller 130.

The destination-for-analysis determination section 132 of the controller 130 determines, as the destination base station of each user equipment UE, a radio base station corresponding to the highest reception power RSRP (that is, a radio base station having the best reception power RSRP) of the macro reception power $RSRP_{Mn}$ and the pico reception power $RSRP_{Pn}$ supplied from the radio communication section 110 (step S120). More specifically, the destination-for-analysis determination section 132 generates a table $T_R$ (FIG. 9) in which, for each of the N user equipments UE, the user equipment $UE_n$, the difference $\Delta_n$ ($=RSRP_{Mn}-RSRP_{Pn}$) between the macro reception power $RSRP_{Mn}$ and the pico reception power $RSRP_{Pn}$ at the user equipment $UE_n$, and the radio base station to which it is determined according to the difference $\Delta_n$ that the user equipment $UE_n$ should connect are associated with each other. It is understood as a matter of course that the set $R_M$ of user equipments UE that should connect to the macro base station 100 and the set $R_P$ of user equipments UE that should connect to the pico base station 200 are found when the table $T_R$ is looked-up.

The destination base station determined in step S120 is a virtual destination base station used to specify a correction value A in step S140, and does not necessarily match the actual destination base station selected in a subsequent step S230.

Among a plurality of user equipments UE, the user-equipment classification section 134 of the controller 130 classifies, according to the macro signal to interference-plus-noise ratios $SINR_M$ and the pico signal to interference-plus-noise ratios $SINR_P$ supplied from the radio communication section 110, user equipments UE in which the macro signal to interference-plus-noise ratio $SINR_{Mn}$ is larger (that is, better) than the pico signal to interference-plus-noise ratio $SINR_{Pn}$ into the set $S_M$, and user equipments UE in which the pico signal to interference-plus-noise ratio $SINR_{Pn}$ is larger than the macro signal to interference-plus-noise ratio $SINR_{Mn}$ into the set $S_P$ (step S130). More specifically, the user-equipment classification section 134 generates a table $T_S$ (FIG. 10) in which, for each of the N user equipments UE, the user equipment $UE_n$, the macro signal to interference-plus-noise ratio $SINR_{Mn}$, the pico signal to interference-plus-noise ratio $SINR_{Pn}$, and a larger signal to interference-plus-noise ratio SINR are associated with each other. It is understood as a matter of course that the set $S_M$ and the set $S_P$ described earlier are found when the table $T_S$ is looked-up.

Step S120 and step S130 may be executed sequentially or in parallel.

Next, the correction-value specifying section 136 of the controller 130 specifies a correction value A according to the table $T_R$ supplied from the destination-for-analysis determination section 132 and the table $T_S$ supplied from the user-equipment classification section 134 so as to reduce the number of user equipments UE included in the product set $D_M$ ($D_M = R_M \cap S_P$) of the set $R_M$ of the user equipments UE that should connect to the macro base station 100 and the set $S_P$ of the user equipments UE in which the pico signal to interference-plus-noise ratio $SINR_P$ is higher (step S140). The correction value A may be specified such that the number of user equipments UE included in the set $D_M$ becomes the minimum.

Figure 11:
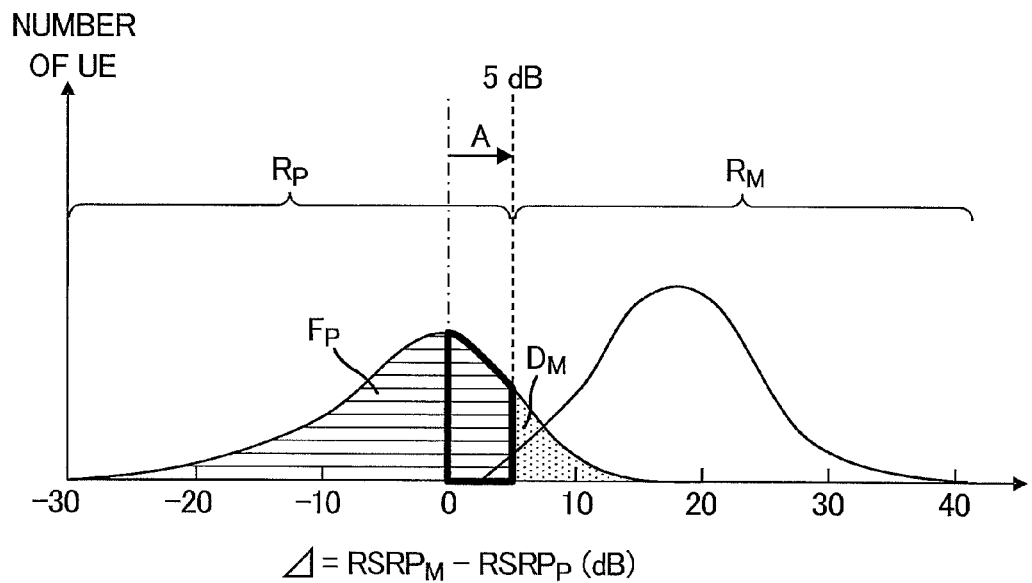
FIG. 11 is a view showing an example of the setting of a correction value in the first embodiment.

The correction value A is specified according to the distribution of the differences Δ between the macro reception powers $RSRP_M$ and the pico reception powers $RSRP_P$ in the set $S_P$. For example, as shown in FIG. 11, the correction value A is specified such that the area occupied by the set $D_M$ becomes smaller. The correction value A can be specified using any procedure. For example, a procedure may be employed in which the number of user equipments UE included in the corrected set $D_M$ is calculated for each of a plurality of correction values temporarily specified, and a temporary correction value with which the number of user equipments UE included in the corrected set $D_M$ is smaller than the number of user equipments UE included in the set $D_M$ before correction is specified as an actual correction value A. When there are a plurality of temporary correction values that serve as actual correction value A candidates, it is preferable to employ a correction value A with which the number of user equipments UE included in the set $D_M$ becomes the minimum. The correction value A may be specified according to an algorithm obtained experimentally.

The correction-value reporting section 138 reports (sends) the correction value A specified by the correction-value specifying section 136 through the radio communication section 110 to each of the plurality of user equipments UE (step S150). The correction value A reported from the macro base station 100 is received by the radio communication section 310 of each user equipment UE and is supplied to and stored in the storage 350.

The characteristic-value measuring section 332 of each user equipment $UE_n$ measures the macro reception power $RSRP_{Mn}$ and the pico reception power $RSRP_{Pn}$ corresponding to the resident cells C (Cm and Cp) (step S200).

The measured pico reception power $RSRP_{Pn}$ is supplied to the characteristic-value correcting section 336. The characteristic-value correcting section 336 reads the correction value A reported from the macro base station 100 and stored in the storage 350 and uses it to correct the supplied pico reception power $RSRP_{Pn}$ to obtain the corrected pico reception power $RSRP_{Pn}'$ ($RSRP_{Pn}'=RSRP_{Pn}+A$) (step S210). The corrected pico reception power $RSRP_{Pn}'$ is supplied to the characteristic-value-for-connection reporting section 338. The measured macro reception power $RSRP_{Mn}$ is directly supplied to the characteristic-value-for-connection reporting section 338.

In summary, only the pico reception power $RSRP_{Pn}$ at the user equipment $UE_n$ is offset with the correction value A to provide the corrected pico reception power $RSRP_{Pn}'$.

The characteristic-value-for-connection reporting section 338 reports (sends) the supplied macro reception power $RSRP_{Mn}$ and the corrected pico reception power $RSRP_{Pn}'$ to the macro base station through the radio communication section 310 (step S220). The reported macro reception power $RSRP_{Mn}$ and the corrected pico reception power $RSRP_{Pn}'$ are supplied to the destination selecting section 140 of the controller 130.

The destination selecting section 140 of the macro base station 100 selects, for each user equipment $UE_n$ as the radio base station to which the user equipment $UE_n$ should connect, a radio base station corresponding to the highest reception power RSRP (that is, the best reception power RSRP) of the supplied macro reception power $RSRP_{Mn}$ and the corrected pico reception power $RSRP_{Pn}'$ (step S230). Then, the destination selecting section 140 reports destination information, $I_n$ indicating the destination radio base station selected for each user equipment $UE_n$ to the user equipment $UE_n$ through the radio communication section 310 (step S240).

The destination information $I_n$ reported from the macro base station 100 is received by the radio communication section 310 of the user equipment $UE_n$ and is supplied to the connection section 340 of the controller 330. The connection section 340 executes radio connection according to the supplied destination information $I_n$ (step S250). Specifically, when the user equipment $UE_n$ has already connected by radio to the radio base station indicated by the destination information $I_n$, the user equipment $UE_n$ maintains the radio connection. On the other hand, when the user equipment $UE_n$ has not yet connected by radio to the radio base station indicated by the destination information $I_n$, the user equipment $UE_n$ executes handover to the indicated radio base station.

As described above, the correction value A is specified for the user equipment UE (steps S100 to S150), and the radio base station to which the user equipment UE should connect is selected (steps S200 to S250). For simplicity of description, the setting of the correction value A and the selection of the radio connection destination have been explained above collectively. The setting of the correction value A and the selection of the radio connection destination can be executed with different frequencies.

For example, the correction value A can be specified (steps S100 to S150) at predetermined first intervals (for example, every one second), and the radio connection destination can be selected (steps S200 to S250) at predetermined second intervals (for example every one millisecond) that are shorter than the first intervals. With the above-described configuration, the measurement of the signal to interference-plus-noise ratio SINR, which imposes a high load on the controller 330 of the user equipment UE, is performed at a lower frequency, and the correction value A is specified with the signal to interference-plus-noise ratio SINR being taken into consideration.

After the correction value A is specified and the radio connection destination is selected according to the correction value A, described above, some of the plurality of user equipments UE connected to the macro base station 100 are handed over to the pico base station 200 (off-loaded to the pico cell Cp). More specifically, as shown in FIG. 5, before the pico reception power $RSRP_P$ is corrected, only user equipments UE located between the position L3 (where the pico base station 200 is located) and the position L2 (where the pico reception power $RSRP_P$ matches the macro reception power $RSRP_M$) are connected by radio to the pico base station 200. After the pico reception power $RSRP_P$ is corrected, user equipments UE located between the position L3 and the position L1 (where the corrected pico reception power $RSRP_P'$ matches the macro reception power $RSRP_M$) are connected by radio to the pico base station 200. In other words, as a result of correction with the correction value A, user equipments UE located between the position L1 and the position L2 are handed over from the macro base station 100 to the pico base station 200.

As understood from the foregoing description, the correction of the pico reception power $RSRP_P$ (the increase with the correction value A) in the characteristic-value correcting section 336 of each user equipment UE increases the apparent pico reception power $RSRP_P$ at the user equipment UE, thus expanding the area of the pico cell Cp formed by the pico base station 200.

Figure 12:
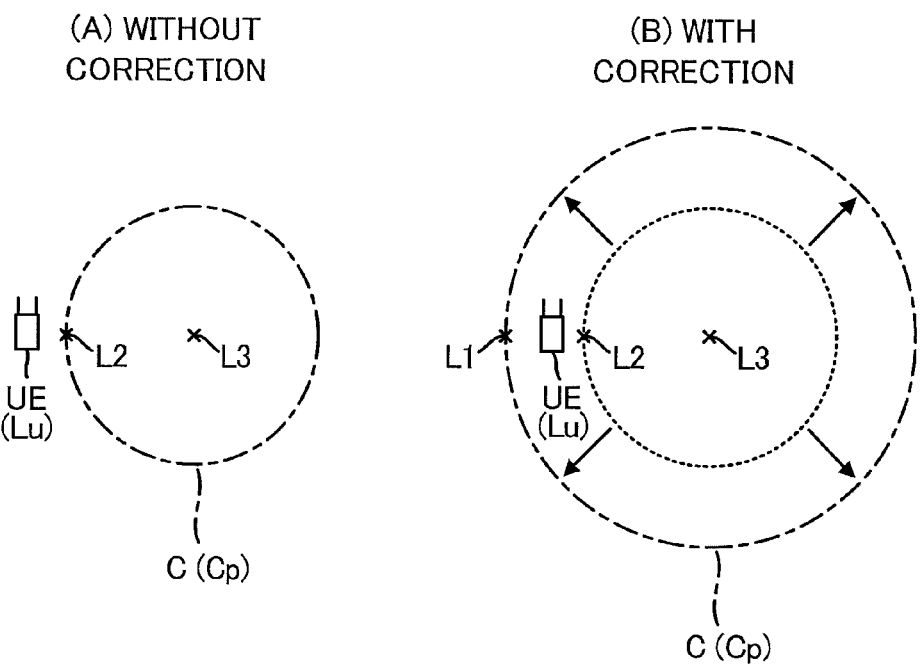
FIG. 12 includes views showing a change in the area of a pico cell according to whether or not the correction is made.

FIG. 12 includes views showing a change in the area of the pico cell Cp, caused by the correction with the correction value A, and corresponds to FIG. 5. Without correction (FIG. 12(A)), since the pico cell Cp formed by the pico base station 200, not shown, disposed at the position L3 has an area in which the pico reception power $RSRP_P$ exceeds the macro reception power $RSRP_M$ (area that includes the position L2 as a point on the boundary), the position Lu, where the user equipment UE is located (position closer to the macro base station 100 than the position L2 is), is outside the pico cell Cp. In contrast, with the correction (FIG. 12(B)), since the pico cell Cp has an area in which the corrected pico reception power $RSRP_P'$ exceeds the macro reception power $RSRP_M$ (area that includes the position L1 as a point on the boundary), the position Lu, where the user equipment UE is located (position closer to the pico base station 200 than the position L1 is), is inside the pico cell Cp. As described above, the correction with the correction value A expands the area of the pico cell Cp.

The user equipments UE included in the portion enclosed by a thick frame in FIG. 11 are handed over from the macro base station 100 to the pico base station 200 as a result of correction with the correction value A. It is understood from the comparison between FIG. 7 and FIG. 11 that, between before and after the correction, the number of user equipments UE included in the set $D_M$ ($D_M = R_M \cap S_P$) is reduced and the number of user equipments UE included in the set $F_P$ ($F_P = R_P \cap S_P$) is increased.

In the embodiment described above, since the pico reception power $RSRP_P$, used to select the radio connection destination of each user equipment UE, is corrected with the correction value A specified with the signal to interference-plus-noise ratio SINR being taken into consideration, a radio base station for which the signal to interference-plus-noise ratio SINR is higher (that is, the reception quality is better) tends be selected as the destination base station of each user equipment UE.

Second Embodiment

A second embodiment of the present invention will be described below. For units having the same effects or functions in the following example embodiments as in the first embodiment, the reference symbols used in the above description will be used again, and a description thereof will be omitted, if unnecessary.

Figure 13:
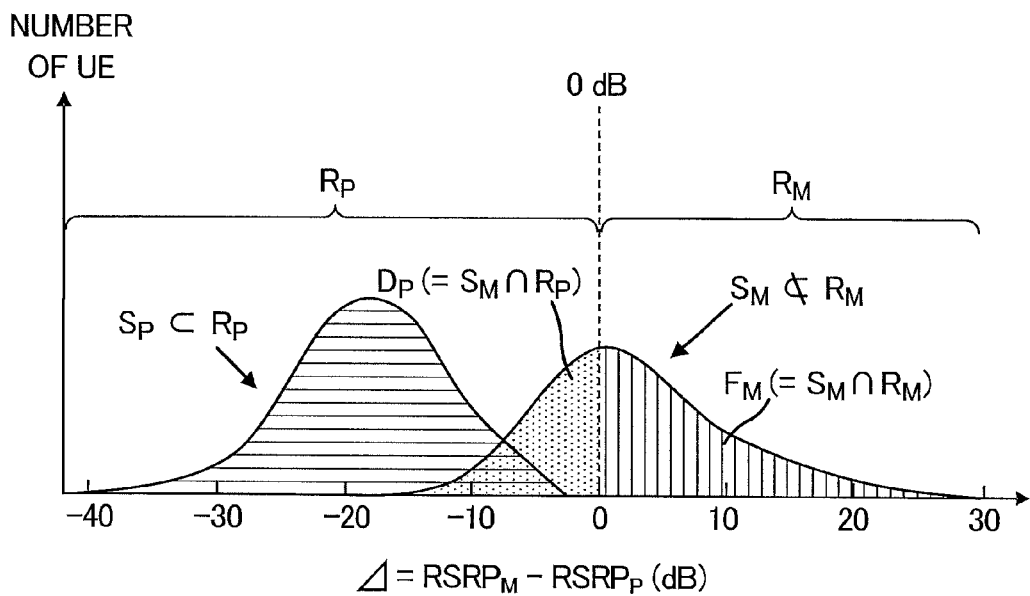
FIG. 13 is a view showing example relationships among reception power, a signal to interference-plus-noise ratio, and a destination radio base station in a second embodiment.

FIG. 13 is a view explaining the relationship between the signal to interference-plus-noise ratios at the user equipments UE and the destination base stations of the user equipments UE according to a second embodiment. In the same manner as in the first embodiment, a set of user equipments UE having positive differences $\Delta (\Delta>0)$ between the macro reception power $RSRP_{Mn}$ and the pico reception power $RSRP_{Pn}$ is called a set $R_M$, and a set of user equipments UE having negative differences $\Delta (\Delta<0)$ is called a set $R_P$.

Unlike the distribution of the differences $\Delta$ shown in FIG. 7 in the first embodiment, all user equipments UE included in the set $S_P$ are included in the set $R_P$. In other words, as a result of the connection-destination selection based on the reception power RSRP, it is determined that all of the user equipments UE included in the set $S_P$ should connect to the pico base station 200, for which the signal to interference-plus-noise ratios SINR are higher.

On the other hand, the user equipments UE included in the set $S_M$ are divided into a subset $F_M$ included in the set $R_M$ and a subset $D_P$ included in the set $R_P$. In other words, as a result of the connection-destination selection based on the reception power RSRP, it is determined that some user equipments UE included in the set $S_M$ (user equipments UE included in the subset $F_M$) should connect to the macro base station 100, for which the signal to interference-plus-noise ratios SINR are higher, but that the other user equipments UE included in the set $S_M$ (user equipments UE included in the subset $D_P$) should be connected to the pico base station 200, for which the signal to interference-plus-noise ratios SINR are lower.

In the same way as in the first embodiment, it is not appropriate, in terms of the convenience of the users of the user equipments UE and the communication quality in the entire radio communication system 1, that a large number of user equipments UE are connected to a base station for which the signal to interference-plus-noise ratios SINR of radio waves are lower.

Therefore, in the second embodiment, the correction-value specifying section 136 of the controller 130 specifies a correction value A according to the table $T_R$ supplied from the destination-for-analysis determination section 132 and the table $T_S$ supplied from the user-equipment classification section 134 so as to reduce the number of user equipments UE included in the product set $D_P$ ($D_P = R_P \cap S_M$) of the set $R_P$ of the user equipments UE that should connect to the pico base station 200 and the set $S_M$ of the user equipments in which the macro signal to interference-plus-noise ratio $SINR_M$ is higher (step S140). The correction value A may be specified such that the number of user equipments UE included in the set $D_P$ becomes the minimum.

Figure 14:
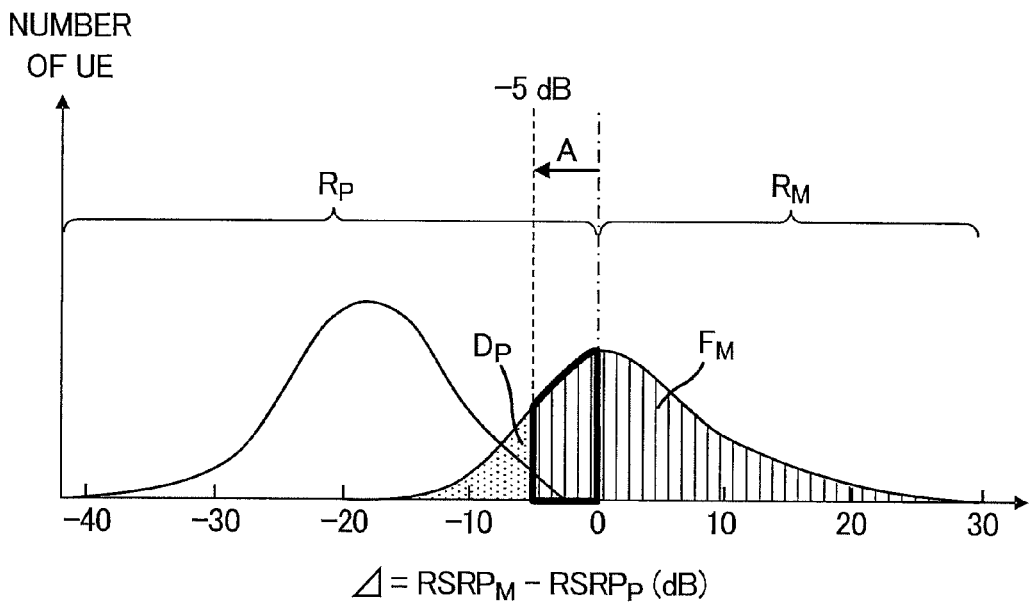
FIG. 14 is a view showing an example of the setting of a correction value in the second embodiment.

The correction value A is specified according to the distribution of the differences $\Delta$ between the macro reception powers $RSRP_M$ and the pico reception powers $RSRP_P$ in the set $S_M$. For example, as shown in FIG. 14, the correction value A is specified such that the area occupied by the set $D_P$ becomes smaller. In the case of FIG. 14, the correction value A is set to a negative value (−5 dB). The correction value A can be specified using any procedure. In the same way as in the first embodiment, a procedure may be employed in which the number of user equipments UE included in the corrected set $D_P$ is calculated for each of a plurality of correction values temporarily specified, and a temporary correction value with which the number of user equipments UE included in the corrected set $D_P$ is reduced between before and after the correction is specified as an actual correction value A. When there are a plurality of temporary correction values that serve as actual correction value A candidates, it is preferable to employ a correction value A with which the number of user equipments UE included in the set $D_P$ becomes the minimum. The correction value A may be specified according to an algorithm obtained experimentally.

After the correction value A is specified and the radio connection destination is selected according to the correction value A, described above, some of the plurality of user equipments UE connected to the pico base station 200 are handed over to the macro base station 100.

The embodiment described above achieves the same effects and advantages as the first embodiment.

Third Embodiment

In the first embodiment, the correction value A is specified such that the number of user equipments UE included in the set $D_M$ is reduced. In the second embodiment, the correction value A is specified such that the number of user equipments UE included in the set $D_P$ is reduced. There is no difference, however, in that the user equipments UE included in either the set $D_M$ or the set $D_P$ are connected to a radio base station for which the signal to interference-plus-noise ratio is lower. Therefore, in a third embodiment, the correction value A is specified so as to reduce the number of user equipments UE connected to a radio base station for which the signal to interference-plus-noise ratio is lower.

Specifically, the correction-value specifying section 136 of a macro base station 100 in the third embodiment specifies a correction value A according to the table $T_R$ supplied from the destination-for-analysis determination section 132 and the table $T_S$ supplied from the user-equipment classification section 134 so as to reduce the sum of the number of user equipments UE included in the product set $D_M$ ($D_M = R_M \cap S_P$) of the set $R_M$ of the user equipments UE that should connect to the macro base station 100 and the set $S_P$ of the user equipments UE in which the pico signal to interference-plus-noise ratio $SINR_P$ is higher and the number of user equipments UE included in the product set $D_P$ ($D_P = R_P \cap S_M$) of the set $R_P$ of the user equipments UE that should connect to the pico base station 200 and the set $S_M$ of the user equipments UE in which the macro signal to interference-plus-noise ratio $SINR_M$ is higher (in other words, the number of user equipments UE included in the union $D_S$ ($D_S = D_M \cup D_P$) of the set $D_M$ and the set $D_P$) (step S140). The correction value A may be specified such that the number of user equipments UE included in the set $D_S$ becomes the minimum.

Figure 15:
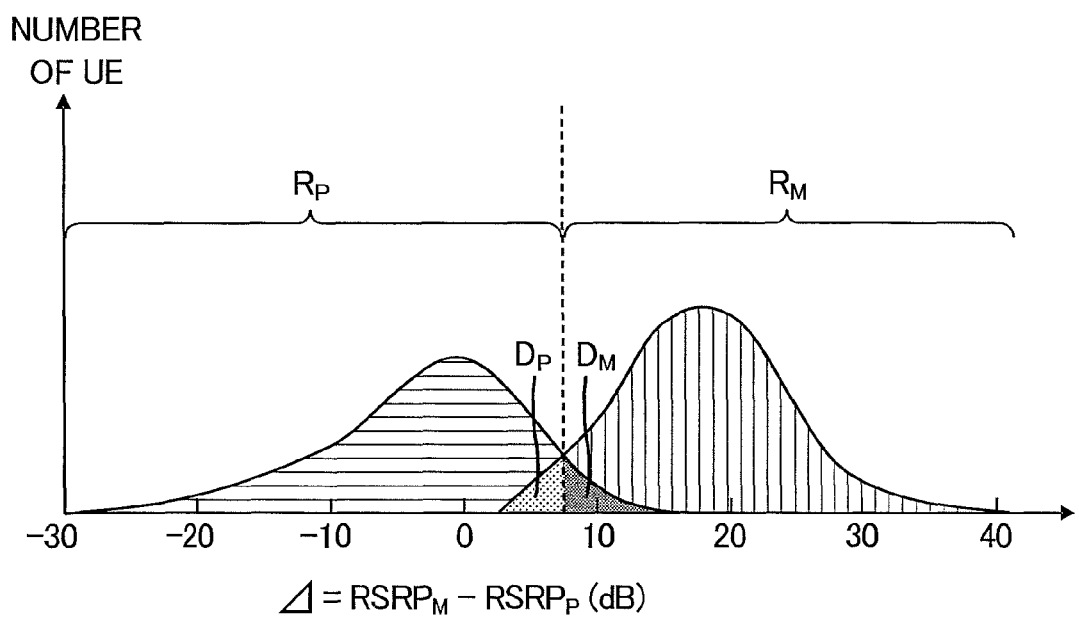
FIG. 15 is a view showing an example of the setting of a correction value in a third embodiment.

The correction value A is specified according to the distribution of the differences Δ between the macro reception powers $RSRP_M$ and the pico reception powers $RSRP_P$ in the set $S_P$ and the distribution of the differences Δ between the macro reception powers $RSRP_M$ and the pico reception powers $RSRP_P$ in the set $S_M$. For example, as shown in FIG. 15, the correction value A is specified such that the sum of the area occupied by the set $D_M$ and the area occupied by the set $D_P$ becomes smaller. The correction value A can be specified using any procedure. In the same way as in the first embodiment and the second embodiment, a procedure may be employed in which the number of user equipments UE included in the corrected set $D_S$ is calculated for each of a plurality of correction values temporarily specified, and a temporary correction value with which the number of user equipments UE included in the corrected set $D_S$ is reduced between before and after the correction is specified as an actual correction value A. When there are a plurality of temporary correction values that serve as actual correction value A candidates, it is preferable to employ a correction value A with which the number of user equipments UE included in the set $D_S$ becomes the minimum. The correction value A may be specified according to an algorithm obtained experimentally.

The embodiment described above achieves the same effects and advantages as the first embodiment and the second embodiment. In view of the fact that, as the correction value A increases, the number of user equipments UE included in the set $D_M$ becomes smaller and the number of user equipments UE included in the set $D_P$ becomes larger, a more appropriate correction value A can be specified according to the trade-off between the number of user equipments UE included in the set $D_M$ and the number of user equipments UE included in the set $D_P$, compared with a configuration in which the correction value A is specified according to only the number of user equipments UE included in the set $D_M$ or only the number of user equipments UE included in the set $D_P$. Therefore, it is possible to increase the number of user equipments UE connected to a radio base station for which the signal to interference-plus-noise ratio SINR is higher.

Modifications

The embodiments described above can be modified in various ways. Specific example modifications will be described below. Two or more of the following modifications selected in a desired manner can be appropriately combined so long as no mutual contradiction occurs.

Modification 1

Figure 16:
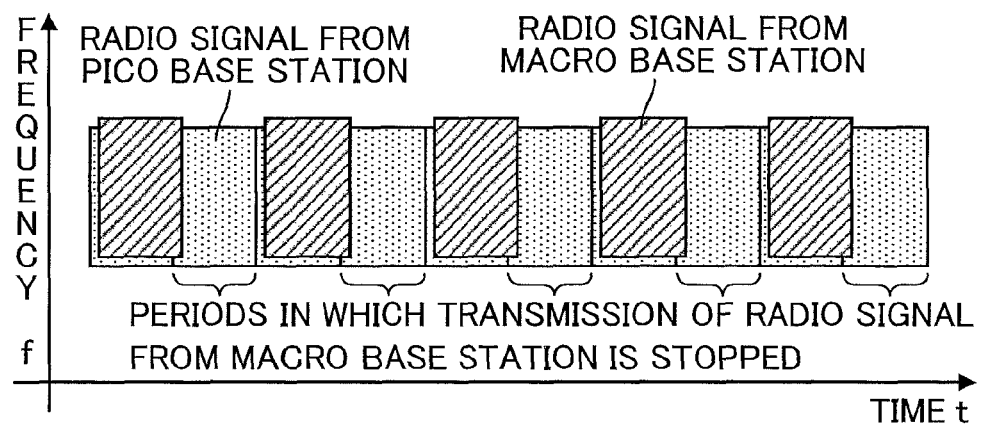
FIG. 16 is a view explaining inter-cell interference coordination.

The above-described embodiments can be combined with any interference control technology. For example, the above-described embodiments can be combined with enhanced inter-cell interference coordination (eICIC) shown in FIG. 16. eICIC is one of the cell interference control technologies in heterogeneous networks. Between base stations having different transmission powers (transmission capabilities), different radio resources (time, frequency, and the like) are used to reduce interference between radio waves sent from the base stations. For example, in the case shown in FIG. 16, a macro base station 100, which has a relatively large transmission power, stops the transmission of radio waves periodically, so that interference on radio waves sent from a pico base station 200 is reduced.

Each of the embodiments of the present invention can be combined with eICIC, described above. Specifically, in eICIC in which the destination base station of the user equipment UE is selected according to the comparison between the reception power $RSRP_M$ of radio waves sent from the macro base station 100 and the reception power $RSRP_P$ of radio waves sent from the pico base station 200 when the macro base station 100 stops the transmission of radio waves, the correction value A can be specified in the same way as in the above-described embodiments by using the signal to interference-plus-noise ratio $SINR_M$ of radio waves sent from the macro base station 100 and the signal to interference-plus-noise ratio $SINR_P$ of radio waves sent from the pico base station 200 when the macro base station 100 stops the transmission of radio waves.

In the above-described combination, interference between radio waves sent from the base stations is reduced by eICIC, and an appropriate correction value is specified (in other words, the radio connection destination of the user equipment UE is appropriately selected) in each of the embodiments of the present invention. Therefore, the radio resources are used more fairly and more efficiently. When eICIC is applied, there is an increased possibility that the reception power RSRP and the signal to interference-plus-noise ratio SINR are uncorrelated (FIG. 6). Even in such a case, the correction value A is appropriately specified according to the signal to interference-plus-noise ratio when the above-described combination is applied.

Modification 2

In the above-described embodiments, a radio-wave reception characteristic used as a direct criterion when the radio base station to which a user equipment UE should connect is selected is the reception power (RSRP). Reception quality (reference signal received quality, RSRQ) or the like may be employed as the radio-wave reception characteristic used as a criterion. In other words, the radio-wave reception characteristic used as a direct criterion when the destination base station is selected (that is, the reception characteristic used in the destination-for-analysis determination section 132 and the destination selecting section 140 of the macro base station 100) needs to be measurable or computable for each base station in the user equipment UE without any high-load processing such as interference-power measurement.

In the above-described embodiments, the correction value A is specified with the signal to interference-plus-noise ratio (SINR) being taken into account to obtain a correction value that takes account of the effect imposed by components other than the desired waves on the desired waves (leading to the selection of the radio connection destination). The signal to interference ratio (SIR) or the signal to noise ratio (SNR), for example, may be taken into consideration when the correction value A is specified. In other words, user equipments UE may be classified according to, for example, the signal to interference ratio (SIR) or the signal to noise ratio (SNR).

Modification 3

In the above-described embodiments, the reception power RSRP is employed, which is a characteristic value that indicates that the larger it is, the better the reception state is. Another characteristic value that indicates a better reception state as it becomes smaller may be employed. For example, the reciprocal of a value indicating the reception power may be used as a characteristic value. In that case, a radio base station corresponding to a smaller characteristic value is determined or selected by the destination-for-analysis determination section 132 and the destination selecting section 140 as the radio connection destination of the user equipment UE.

Modification 4

In the above-described embodiments, the pico base stations 200 are exemplified as base stations having a lower transmission capability than the macro base station 100. A micro base station, a nano base station, a femto base station, a remote radio head, or the like may be used as a base station having a lower transmission capability.

In particular, as an element of the radio communication system 1, a combination of a plurality of base stations having different transmission capabilities (for example, a combination of a macro base station, a pico base station, and a femto base station) may be used. In that case, it is preferable that the correction value A be determined independently according to the transmission capability of each base station (for example, that a correction value A1 determined for the pico base station be different from a correction value A2 determined for the femto base station).

Modification 5

In the above-described embodiments, the destination selecting section 140 of the macro base station 100 selects a radio base station serving as the connection destination of a user equipment $UE_n$ according to the reception power RSRP ($RSRP_{Mn}$, $RSRP_{Pn}'$) reported from the characteristic-value-for-connection reporting section 338 of the user equipment $UE_n$. A destination selection section provided in the controller 330 of the user equipment UE may select a radio base station serving as the connection destination according to the reception power RSRP ($RSRP_{Mn}$, $RSRP_{Pn}'$) obtained by the user equipment UE itself.

Modification 6

The user equipments UE are devices capable of communicating with each base station (macro base station 100, pico base station 200) by radio. For example, the user equipments UE may be portable telephone terminals, such as feature phones or smart phones, desktop personal computers, notebook personal computers, ultra-mobile personal computers (UMPCs), portable game machines, or other radio terminals.

Modification 7

The functions executed by the CPU in each element (macro base station 100, pico base station 200, user equipment UE) in the radio communication system 1 may be executed by hardware instead of the CPU, or may be executed by a programmable logic device, such as a field programmable gate array (FPGA) or a digital signal processor (DSP).

REFERENCE NUMERALS

1: Radio communication system
100: Macro base station
110: Radio communication section
112: Transmission and reception antennas
120: Base-station communication section
130: Controller
132: Destination-for-analysis determination section
134: User-equipment classification section
136: Correction-value specifying section
138: Correction-value reporting section
140: Destination selecting section
200: Pico base station
210: Radio communication section
212: Transmission and reception antennas
220: Base-station communication section
230: Controller
310: Radio communication section
312: Transmission and reception antennas
330: Controller
332: Characteristic-value measuring section
334: Characteristic-value-for-analysis reporting section
336: Characteristic-value correcting section
338: Characteristic-value-for-connection reporting section
340: Connection section
350: Storage
A: Correction value
C: Cell
Cm: Macro cell
Cp: Pico cell
I: Destination information
L (L0 to L3, Lu): Positions
RSRP: Reception power
$RSRP_M$: Macro reception power
$RSRP_P$: Pico reception power
SINR: Signal to interference-plus-noise ratio
$SINR_M$: Macro signal to interference-plus-noise ratio
$SINR_P$: Pico signal to interference-plus-noise ratio
$T_R$, $T_S$: Tables
UE: User equipment
Δ: Difference

The invention claimed is:
1. A radio communication system comprising:
a first radio base station that forms a first cell;
a plurality of second radio base stations each of which forms, in the first cell, a second cell having a smaller area than the first cell; and
a plurality of mobile stations each of which comprises a radio communication section capable of executing radio communication by sending and receiving radio waves to and from each of the first radio base station and a second radio base station respectively corresponding to cells in which the mobile station is located among the first cell and the second cells;

wherein each of the plurality of mobile stations further comprises:
a characteristic-value measuring section that measures a first reception characteristic value and a second reception characteristic value related to radio waves sent from each of the first radio base station and the second radio base station corresponding to the first cell and the second cell in which the mobile station is located; and
a characteristic-value reporting section that reports the first reception characteristic value and the second reception characteristic value corresponding to each of the first radio base station and the second radio base station to the first radio base station through the radio communication section;
the first radio base station comprises:
a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;
a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;
a correction-value specifying section that specifies, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the first radio base station, among the mobile stations included in the second mobile-station group; and
a correction-value reporting section that reports the correction value specified by the correction-value specifying section to the plurality of mobile stations;
each of the plurality of mobile stations further comprises a characteristic-value correcting section that corrects the first reception characteristic value related to radio waves sent from the second radio base station, measured by the characteristic-value measuring section, by using the correction value reported from the correction-value reporting section of the first radio base station; and
either the first radio base station or each of the plurality of mobile stations comprises a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

2. The radio communication system according to claim 1, wherein the correction-value specifying section of the first radio base station specifies the correction value used to correct the first reception characteristic value corresponding to each of the second radio base stations, measured by each of the plurality of mobile stations, such that the number of mobile stations having the first reception characteristic values with which the destination determination section determines that the mobile stations should connect to the first radio base station becomes the minimum among the mobile stations included in the second mobile-station group.

3. A radio communication system comprising:
a first radio base station that forms a first cell;
a plurality of second radio base stations each of which forms, in the first cell, a second cell having a smaller area than the first cell; and
a plurality of mobile stations each of which comprises a radio communication section capable of executing radio communication by sending and receiving radio waves to and from each of the first radio base station and a second radio base station respectively corresponding to cells in which the mobile station is located among the first cell and the second cells;
wherein each of the plurality of mobile stations further comprises:
a characteristic-value measuring section that measures a first reception characteristic value and a second reception characteristic value related to radio waves sent from each of the first radio base station and the second radio base station corresponding to the first cell and the second cell in which the mobile station is located; and
a characteristic-value reporting section that reports the first reception characteristic value and the second reception characteristic value corresponding to each of the first radio base station and the second radio base station to the first radio base station through the radio communication section;
the first radio base station comprises:
a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;
a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;

a correction-value specifying section that specifies, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations;

each of the plurality of mobile stations further comprises a characteristic-value correcting section that corrects the first reception characteristic value related to radio waves sent from the second radio base station, measured by the characteristic-value measuring section, by using the correction value reported from the correction-value reporting section of the first radio base station; and either the first radio base station or each of the plurality of mobile stations comprises a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

4. The radio communication system according to claim 3, wherein the correction-value specifying section of the first radio base station specifies the correction value used to correct the first reception characteristic value corresponding to each of the second radio base stations, measured by each of the plurality of mobile stations, such that the number of mobile stations having the first reception characteristic values with which the destination determination section determines that the mobile stations should connect to the second radio base station becomes the minimum among the mobile stations included in the first mobile-station group.

5. A radio communication system comprising:

a first radio base station that forms a first cell;

a plurality of second radio base stations each of which forms, in the first cell, a second cell having a smaller area than the first cell; and a plurality of mobile stations each of which comprises a radio communication section capable of executing radio communication by sending and receiving radio waves to and from each of the first radio base station and a second radio base station respectively corresponding to cells in which the mobile station is located among the first cell and the second cells;

wherein each of the plurality of mobile stations further comprises:

a characteristic-value measuring section that measures a first reception characteristic value and a second reception characteristic value related to radio waves sent from each of the first radio base station and the second radio base station corresponding to the first cell and the second cell in which the mobile station is located; and a characteristic-value reporting section that reports the first reception characteristic value and the second reception characteristic value corresponding to each of the first radio base station and the second radio base station to the first radio base station through the radio communication section;

the first radio base station comprises:

a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;

a correction-value specifying section that specifies, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations;

each of the plurality of mobile stations further comprises a characteristic-value correcting section that corrects the first reception characteristic value related to radio waves sent from the second radio base station, measured by the characteristic-value measuring section, by using the correction value reported from the correction-value reporting section of the first radio base station; and either the first radio base station or each of the plurality of mobile stations comprises a destination selecting section that selects, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

6. The radio communication system according to claim 5, wherein the correction-value specifying section of the first radio base station specifies the correction value used to correct the first reception characteristic value corresponding to each of the second radio base stations, measured by each of the plurality of mobile stations, such that the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group, becomes the minimum.

7. The radio communication system according to claim 1, wherein, at first predetermined intervals, each of the plurality of mobile stations measures and reports the first reception characteristic value and the second reception characteristic value, and the first radio base station determines the radio base station to which each of the plurality of mobile stations should connect, classifies the plurality of mobile stations, specifies the correction value, and reports the correction value to the plurality of mobile stations; and at second predetermined intervals shorter than the first predetermined intervals, each of the plurality of mobile stations measures the first reception characteristic value and corrects the first reception characteristic value related to radio waves sent from the second radio base station by using the correction value, and either the first radio base station or each of the plurality of mobile stations selects the radio base station to which the mobile station should connect.

8. The radio communication system according to claim 3, wherein, at first predetermined intervals, each of the plurality of mobile stations measures and reports the first reception characteristic value and the second reception characteristic value, and the first radio base station determines the radio base station to which each of the plurality of mobile stations should connect, classifies the plurality of mobile stations, specifies the correction value, and reports the correction value to the plurality of mobile stations; and at second predetermined intervals shorter than the first predetermined intervals, each of the plurality of mobile stations measures the first reception characteristic value and corrects the first reception characteristic value related to radio waves sent from the second radio base station by using the correction value, and either the first radio base station or each of the plurality of mobile stations selects the radio base station to which the mobile station should connect.

9. The radio communication system according to claim 5, wherein, at first predetermined intervals, each of the plurality of mobile stations measures and reports the first reception characteristic value and the second reception characteristic value, and the first radio base station determines the radio base station to which each of the plurality of mobile stations should connect, classifies the plurality of mobile stations, specifies the correction value, and reports the correction value to the plurality of mobile stations; and at second predetermined intervals shorter than the first predetermined intervals, each of the plurality of mobile stations measures the first reception characteristic value and corrects the first reception characteristic value related to radio waves sent from the second radio base station by using the correction value, and either the first radio base station or each of the plurality of mobile stations selects the radio base station to which the mobile station should connect.

10. A radio base station that is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section;

the first radio base station comprising:

a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;

a correction-value specifying section that specifies, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the first radio base station, among the mobile stations included in the second mobile-station group; and a correction-value reporting section that reports the correction value specified by the correction-value specifying section to the plurality of mobile stations.

11. A radio base station that is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section;

the first radio base station comprising:
a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;

a correction-value specifying section that specifies, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations.

12. A radio base station that is a first radio base station in a radio communication system comprising: the first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells, a characteristic-value measuring section that measures a first reception characteristic value and a second reception characteristic value related to radio waves sent from each of the first radio base station and the second radio base station corresponding to the first cell and the second cell in which the mobile station is located, and a characteristic-value reporting section that reports the first reception characteristic value and the second reception characteristic value corresponding to each of the first radio base station and the second radio base station to the first radio base station through the radio communication section;

the first radio base station comprising:
a destination determination section that determines, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

a mobile-station classification section that classifies mobile stations in which the second reception characteristic value corresponding to the first radio base station is better than the second reception characteristic value corresponding to the second radio base station into a first mobile-station group, and classifies mobile stations in which the second reception characteristic value corresponding to the second radio base station is better than the second reception characteristic value corresponding to the first radio base station into a second mobile-station group, among the plurality of mobile stations;

a correction-value specifying section that specifies, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which the destination determination section determines that the mobile stations should connect to the first radio base station, among the mobile stations included in the second mobile-station group, and the number of mobile stations having the first reception characteristic values with which the destination determination section determines that the mobile stations should connect to the second radio base station, among the mobile stations included in the first mobile-station group; and a correction-value reporting section that reports the correction value specified by the correction-value specifying section to the plurality of mobile stations.

13. A communication control method for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells;

the communication control method comprising:

measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations;

determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations;

specifying, according to a distribution of differences between the first reception characteristic values corresponding to the first radio base station and the first reception characteristic values corresponding to the second radio base station, measured by the mobile stations included in the second mobile-station group, a correction value used to correct the first reception characteristic value corresponding to each of the second radio base stations, measured by each of the plurality of mobile stations, so as to reduce the number of mobile stations having the first reception characteristic values with which it is determined that the mobile stations should connect to the first radio base station, among the mobile stations included in the second mobile-station group;

reporting the specified correction value to the plurality of mobile stations;

correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

14. A communication control method for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells;

the communication control method comprising:

measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations;

determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations;

specifying, according to a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the number of mobile stations having the first reception characteristic values with which it is determined that the mobile stations should connect to the second radio base station, among the mobile stations included in the first mobile-station group;

reporting the specified correction value to the plurality of mobile stations;

correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

15. A communication control method for a radio communication system that includes a first radio base station that forms a first cell; a plurality of second radio base stations each of which forms, in the first cell, a second cell having a smaller area than the first cell; and a plurality of mobile stations each of which includes a radio communication section capable of executing radio communication by sending and receiving radio waves to and from each of the first radio base station and a second radio base station respectively corresponding to cells in which the mobile station is located among the first cell and the second cells;

the communication control method comprising:

measuring a first reception characteristic value and a second reception characteristic value related to radio waves sent from each of the first radio base station and the second radio base station corresponding to the first cell and the second cell in which the mobile station is located and reporting the first reception characteristic value and the second reception characteristic value corresponding to each of the first radio base station and the second radio base station to the first radio base station through the radio communication section, in each of the plurality of mobile stations;

determining, for each of the plurality of mobile stations, a radio base station having the best first reception characteristic value among the first radio base station corresponding to the first reception characteristic value and the second reception characteristic value reported from the mobile station and the second radio base station corresponding to the first reception characteristic value and the second reception characteristic value reported from the mobile station, as a radio base station to which the mobile station should connect;

classifying mobile stations in which the second reception characteristic value corresponding to the first radio base station is better than the second reception characteristic value corresponding to the second radio base station into a first mobile-station group, and classifying mobile stations in which the second reception characteristic value corresponding to the second radio base station is better than the second reception characteristic value corresponding to the first radio base station into a second mobile-station group, among the plurality of mobile stations;

specifying, according to a distribution of differences between the first reception characteristic values corresponding to the first radio base station and the first reception characteristic values corresponding to the second radio base station, measured by the mobile stations included in the second mobile-station group, and a distribution of differences between the first reception characteristic values corresponding to the first radio base station and the first reception characteristic values corresponding to the second radio base station, measured by the mobile stations included in the first mobile-station group, a correction value used to correct the first reception characteristic value corresponding to each of the second radio base stations, measured by each of the plurality of mobile stations, so as to reduce the sum of the number of mobile stations having the first reception characteristic values with which it is determined that the mobile stations should connect to the first radio base station, among the mobile stations included in the second mobile-station group, and the number of mobile stations having the first reception characteristic values with which it is determined that the mobile stations should connect to the second radio base station, among the mobile stations included in the first mobile-station group;

reporting the specified correction value to the plurality of mobile stations;

correcting the measured first reception characteristic value related to radio waves sent from the second radio base station by using the correction value reported from the first radio base station, in each of the plurality of mobile stations; and selecting, as a radio base station to which the mobile station should connect, a radio base station corresponding to the best first reception characteristic value among the first reception characteristic value corresponding to the first radio base station and the first reception characteristic value corrected with the correction value, corresponding to the second radio base station.

\* \* \* \* \*